United States Patent
Matsumoto (10) Patent No.: US 7,509,846 B2
(45) Date of Patent: Mar. 31, 2009

(54) CHASSIS DYNAMOMETER

(75) Inventor: Sigeru Matsumoto, Tokyo (JP)

(73) Assignee: Kokusai Keisokuki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/077,791

(22) Filed: Mar. 21, 2008

(65) Prior Publication Data

US 2008/0209994 A1 Sep. 4, 2008

Related U.S. Application Data

(63) Continuation of application No. PCT/JP2006/318950, filed on Sep. 25, 2006.

(30) Foreign Application Priority Data

Sep. 26, 2005 (JP) ............................. 2005-278911
Sep. 26, 2005 (JP) ............................. 2005-278912

(51) Int. Cl.
*G01M 17/00* (2006.01)

(52) U.S. Cl. ................................. 73/116.07
(58) Field of Classification Search .............. 73/115.01, 73/116.01, 116.05, 116.06, 116.07, 116.08, 73/117.01, 118.01, 123, 670
See application file for complete search history.

(56) References Cited

U.S. PATENT DOCUMENTS

| | | | |
|---|---|---|---|
| 3,520,180 A | | 7/1970 | Polhemus et al. |
| 3,886,788 A | * | 6/1975 | Jeter, Jr. ................... 73/116.11 |
| 4,862,737 A | * | 9/1989 | Langer ...................... 73/116.07 |
| 5,111,685 A | * | 5/1992 | Langer ...................... 73/118.01 |
| 5,337,600 A | * | 8/1994 | Kaneko et al. ............. 73/116.07 |
| 6,427,528 B1 | * | 8/2002 | Yamakado et al. ............. 73/121 |
| 6,601,445 B2 | * | 8/2003 | Cordes ........................ 73/123 |
| 6,739,185 B2 | * | 5/2004 | Schoeninger ................ 73/146 |
| 7,213,449 B2 | * | 5/2007 | Barnes et al. ............. 73/116.11 |
| 2005/0028584 A1 | * | 2/2005 | Barnes et al. .............. 73/117.1 |
| 2008/0087104 A1 | * | 4/2008 | Matsumoto .............. 73/862.55 |

FOREIGN PATENT DOCUMENTS

| | | |
|---|---|---|
| JP | 4-9733 | 1/1992 |
| JP | 5-319611 | 12/1993 |
| JP | 6-026997 | 2/1994 |
| JP | 6-207886 | 7/1994 |
| JP | 7-243945 | 9/1995 |
| JP | 11-509926 | 8/1999 |
| JP | 2005-83812 | 3/2005 |

* cited by examiner

*Primary Examiner*—Eric S McCall
(74) *Attorney, Agent, or Firm*—Day Pitney LLP (57) ABSTRACT

A chassis dynamometer includes a flat-belt mechanism configured such that a drive wheel of a vehicle is placed thereon, which includes a rotating member configured to be rotated by rotation of the drive wheel, a bearing portion configured to rotatably support the rotating member, a motor configured to apply a resistance to the rotation of the rotating member, and a bearing supporting member to which a housing of the bearing portion and the motor are fixed, a base configured to support the bearing supporting member from beneath the bearing supporting member, a plurality of three-component force sensors arranged between the bearing supporting member and the base to measure a force transmitted from the drive wheel to the flat-belt mechanism, and a computing unit configured to compute moments with respect to three axes based on measurement results of the plurality of three-component force sensors.

18 Claims, 6 Drawing Sheets

CHASSIS DYNAMOMETER

CROSS-REFERENCE TO RELATED APPLICATION

This is a Continuation Application based on International Application No. PCT/JP2006/318950 filed on Sep. 25, 2006, which claims priorities from Japanese Patent Applications No. 2005-278911 and No. 2005-278912, both filed on Sep. 26, 2005. The entire disclosures of the prior applications are incorporated herein by reference.

BACKGROUND

1. Field of the Invention

The present invention relates to a vehicle traveling test apparatus, such as a chassis dynamometer, configured to cause a wheel of a vehicle such as a car to rotate in a state where a frame of the vehicle is kept still and to carry out various tests for the car.

2. Related Art

Recently, instead of letting a car travel on a test course, a traveling test apparatus by which various measurements are carried out by driving the car in a room is being utilized. In the traveling test apparatus, a drive wheel of the car is caused to contact a drum or an endless belt, and a body of the car is kept still even though the drive wheel rotates. By the above traveling test apparatus, there are performed various tests such as measurement of vibration of the car body and/or noises inside the car generated while the car is traveling, measurement of gas emission, and a test of an effect of a steering wheel. In such a test apparatus, a belt-type apparatus that causes a tire to contact a plane is preferred rather than a drum-type apparatus that causes the tire to contact a curved surface. There is cited as such a traveling test apparatus a chassis dynamometer disclosed in Japanese Patent Provisional Publication No. HEI 6-207886. The chassis dynamometer reproduces various traveling conditions by applying a load to a drum or an endless belt rotated in conjunction with a drive wheel while the drive wheel is rotating (it is referred to as drive absorption). In such a chassis dynamometer, a motor for the drive absorption is prepared outside the chassis dynamometer.

There is included in such a chassis dynamometer a chassis dynamometer configured with a load sensor provided at a bearing that supports a rotating member such as a pair of rollers around which the endless belt is hung and the drum so as to measure variation of a load transmitted from the drive wheel of the car to the drum or the endless belt. Thus, by the load sensor being provided to the chassis dynamometer, it is possible to evaluate the vibration of the car and the noises inside the car without attaching any sensor to the car.

Additionally, in such a belt-type traveling test apparatus, when there is caused unconformity between a circumferential direction of the tire and a traveling direction of the endless belt, a lateral force is applied to the belt. When the lateral force exceeds a predetermined value, the endless belt is laterally shifted from the pair of rollers. Since the shift of the belt might cause drop-off and/or fracture of the endless belt, it is desired to avoid the shift as much as possible.

In a configuration of the traveling test apparatus disclosed in Japanese Patent Provisional Publication No. HEI 6-207886, rotation shafts of the pair of rollers around which the endless belt is hung can be tilted, and when the shift of the endless belt is detected, the shift is recovered by tilting the rotation shafts such that the endless belt moves in an opposite direction of a direction in which the endless belt has shifted.

SUMMARY OF THE INVENTION

However, in the conventional chassis dynamometer, the motor for the drive absorption is provided outside the chassis dynamometer, and the motor is supported independently from the drum or the rollers. In the chassis dynamometer thus configured, even when the drum or the pair of rollers thereof is driven without placing the drive wheel of the car on the drum or the pair of rollers, a load is detected by the load sensor. The load is referred to as a mechanical loss, and when a load is applied to the drum or the pair of rollers while the drive wheel of the car is placed on the drum or the pair of rollers, the aforementioned mechanical loss is detected by the load sensor as well as a load transmitted from the drive wheel of the car to the drum or the pair of rollers. Therefore, in the conventional chassis dynamometer, a torque meter is attached to the rotation shaft of the motor, and an amount of the mechanical loss is presumed from a detection result by the torque meter, calibrating an output of the load sensor with the presumed amount of the mechanical loss. However, since the presumed mechanical loss contains an error, it has not been easy to make accurate measurement of the amount of the load transmitted from the drive wheel to the drum or rollers. Hence, a chassis dynamometer capable of more accurately measuring the load transmitted from the drive wheel of the car has been desired.

Further, when examining a behavior of the tire during the time when the car is traveling straight ahead by the traveling test apparatus, it is desired to avoid the shift of the endless belt as much as possible. On the other hand, the configuration disclosed in Japanese Patent Provisional Publication No. HEI 6-207886 is for preventing the progress of the shift and recovering the shift, yet not for avoiding the shift. For this reason, a traveling test apparatus capable of avoiding the shift of the endless belt has been desired.

To attain the aforementioned objects, according to an aspect of the present invention, there is provided a chassis dynamometer that includes a flat-belt mechanism configured such that a drive wheel of a vehicle is placed thereon, which includes a rotating member configured to be rotated by rotation of the drive wheel, a bearing portion configured to rotatably support the rotating member, a motor configured to apply a resistance to the rotation of the rotating member, and a bearing supporting member to which a housing of the bearing portion and the motor are fixed, a base configured to support the bearing supporting member from beneath the bearing supporting member, a plurality of three-component force sensors arranged between the bearing supporting member and the base to measure a force transmitted from the drive wheel to the flat-belt mechanism, and a computing unit configured to compute moments with respect to three axes based on measurement results of the plurality of three-component force sensors.

DETAILED DESCRIPTION OF THE EMBODIMENT

Figure 1:
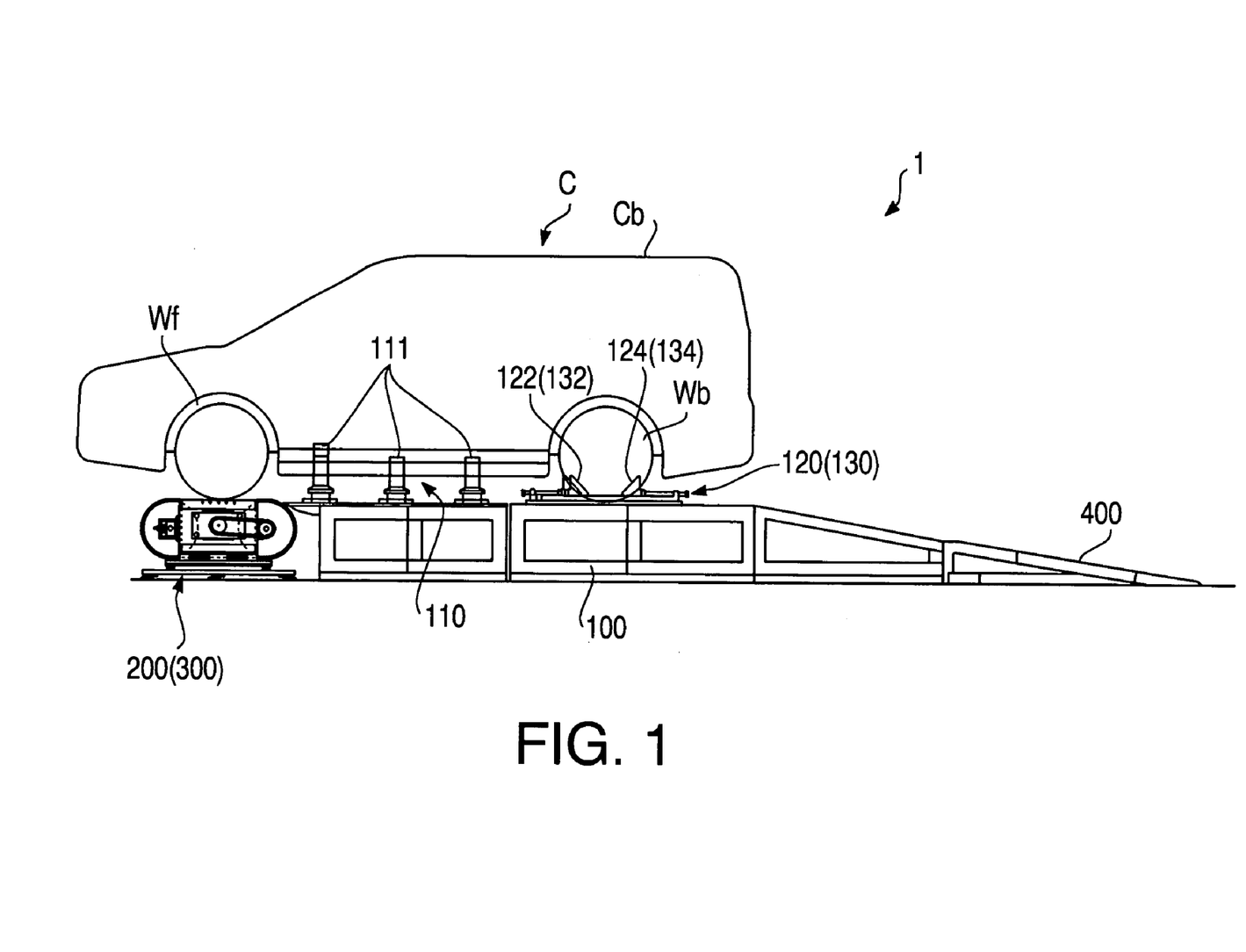
FIG. 1 is a side view of a chassis dynamometer in an embodiment according to the present invention.
Figure 2:
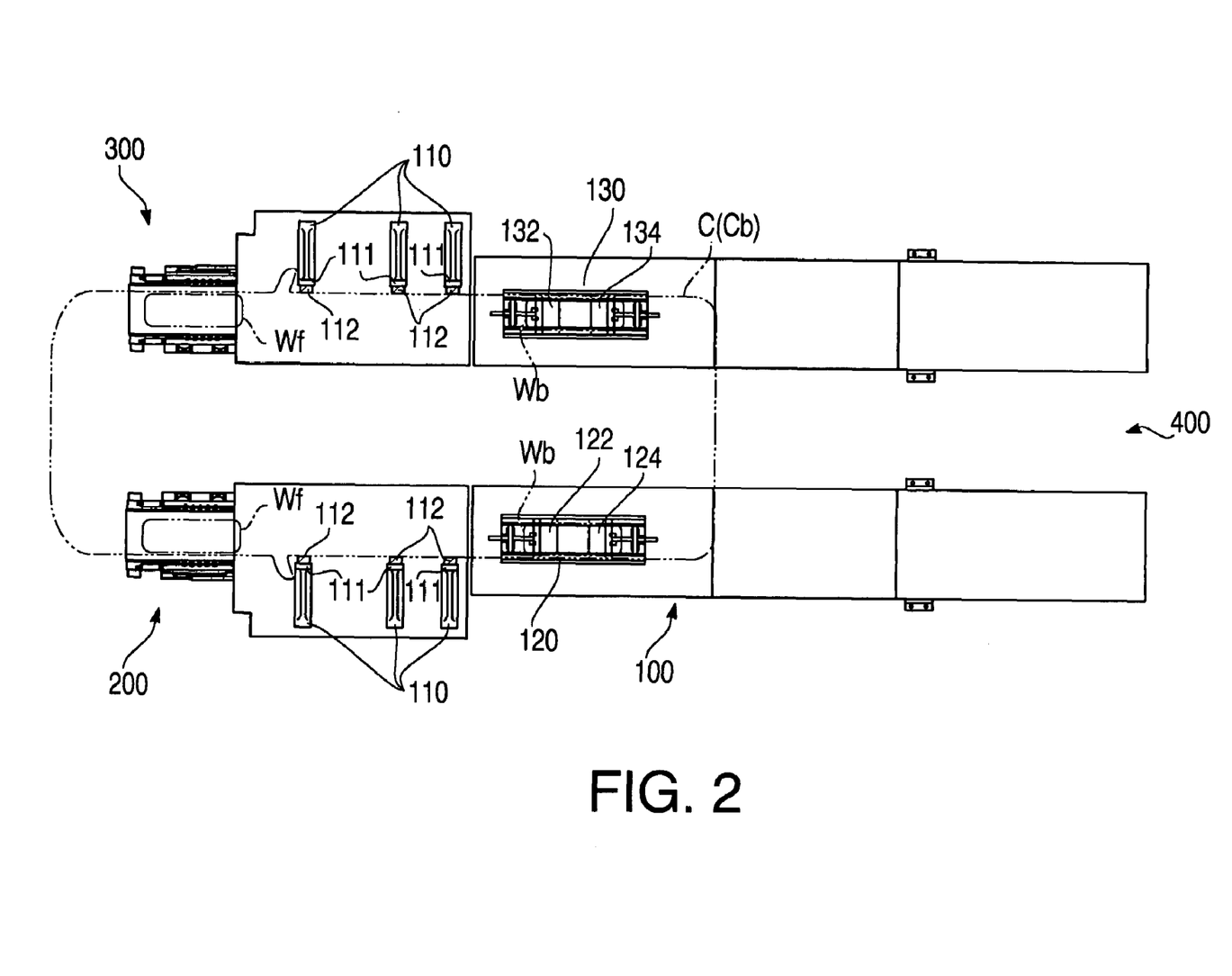
FIG. 2 is a top view of the chassis dynamometer in the embodiment according to the present invention.

Hereinafter, an embodiment according to the present invention will be described with reference to the accompanying drawings. FIG. 1 is a side view of a chassis dynamometer 1 as a traveling test apparatus in the embodiment according to the present invention. In addition, FIG. 2 is a top view of the chassis dynamometer 1. The chassis dynamometer 1 is an apparatus configured to provide a drive wheel of a car (a front tire in the present embodiment) with traveling conditions similar to those while the car is actually traveling and perform various measurements. The measurement data are transmitted to a control unit 800 (described below) of the chassis dynamometer 1 and processed by the control unit 800.

As shown in FIG. 1, the chassis dynamometer 1 includes a base stage 100 for holding a lower portion of a body of a car C to be tested from both sides of the car C in a width direction, a pair of flat-belt mechanisms 200 and 300 (see FIG. 2) on which two front tires Wf of the car C are respectively placed, and a slope 400 for moving the car C on the base stage 100 and the flat-belt mechanism 200. It is noted that, in the present embodiment, the car C is front-wheel-drive. In the following description, there are defined, based on a direction of the car C, a front side of the car C as a "front", a rear side of the car C as a "rear", a width direction of the car C as a "width direction."

As shown in FIG. 1, there are provided on the base stage 100 L-shaped guides 110 for fixing a body Cb of the car C and a pair of tire holding tools 120 and 130 for fixing two rear tires of the car C.

The L-shaped guides 110 are provided with three of them at each of both right and left sides of the car C such that one end 111 of each of the L-shaped guides 110 contacts a corresponding side of the car C. A pad 112 (FIG. 2) formed from material such as rubber and urethane is provided at the end 111 of each of the L-shaped guides 110 that contacts the body Cb of the car C, and the car C is kept still by a frictional force generated between the pad 112 and the body Cb. So as to meet cars with various widths and shapes, each of the L-shaped guides 110 is configured such that a position thereof in the width direction and a height of the end 111 thereof are adjustable. As a mechanism for the adjustment, there can be utilized various widely-known position adjustment mechanism such as a rack-and pinion mechanism, a feed screw mechanism, and a hydraulic mechanism.

In the present embodiment, although the car C is held with the L-shaped guides 110 sandwiching the body Cb of the car C from both ends of the car C in the width direction, the present invention is not limited to the above configuration, and alternatively, such a mechanism as to fix a jack-up point of the car C to the base stage 100 may be employed.

Each of the tire holding means 120 (130) is provided with clamps 122 (132) and 124 (134) to grip the tire from the front and rear thereof. The clamps 122 (132) and 124 (134), each of which is movable, are configured to grip and fix the tire of the car C by pinching the tire from both the front side and rear side thereof. There can be utilized as a movement mechanism a various widely-known position adjustment mechanism such as a rack-and-pinion mechanism, feed screw mechanism, and hydraulic mechanism.

As described above, since the car C is front-wheel-drive in the present embodiment, the front tires Wf are placed on the flat-belt mechanisms 200 and 300, and the rear tires Wb are fixed onto the base stage 100. However, when the car C is rear-wheel-drive, the rear tires Wb are placed on the flat-belt mechanisms 200 and 300, and the front tires Wf are fixed onto the base stage 100. Further, when the car C is four-wheel-drive, four flat-belt mechanisms are prepared, and all drive wheels are placed on the different flat-belts, respectively.

When the car C is placed on the chassis dynamometer 1 configured as above and the front tires Wf of the car C are driven, the endless belts of the flat-belt mechanisms 200 and 300 are revolved in a front-to-rear direction along with the rotation of the front wheels Wf. At this time, various traveling conditions can be reproduced by applying forces along a rotational direction to the endless belts with the motors for the drive absorption that are provided to the flat-belt mechanisms 200 and 300. For example, a condition as a downslope can be reproduced by applying a force in a traveling direction of the endless belt to the endless belt, and a condition as an upslope can be reproduced by applying a force in an opposite direction of the traveling direction to the endless belt. In addition, by measuring circumferential velocities of the flat-belts with below-mentioned rotary encoders and applying loads depending on accelerations of the flat-belts, an inertia force to be generated while accelerating or decelerating the car C can be applied to the body Cb of the car C. That is, a transitional traveling condition while accelerating or decelerating the car C can be reproduced.

Figure 3:
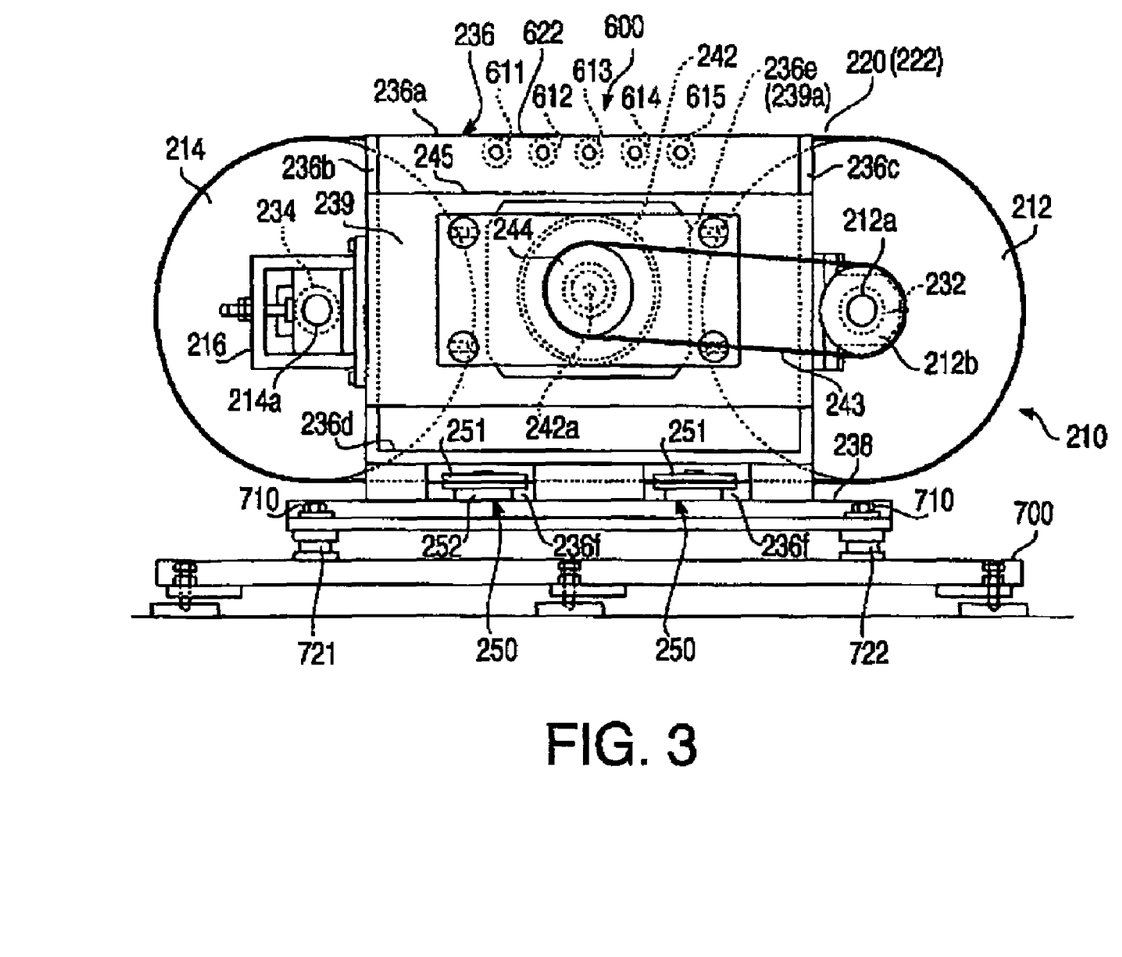
FIG. 3 is a side view of a flat-belt mechanism in the embodiment according to the present invention.
Figure 4:
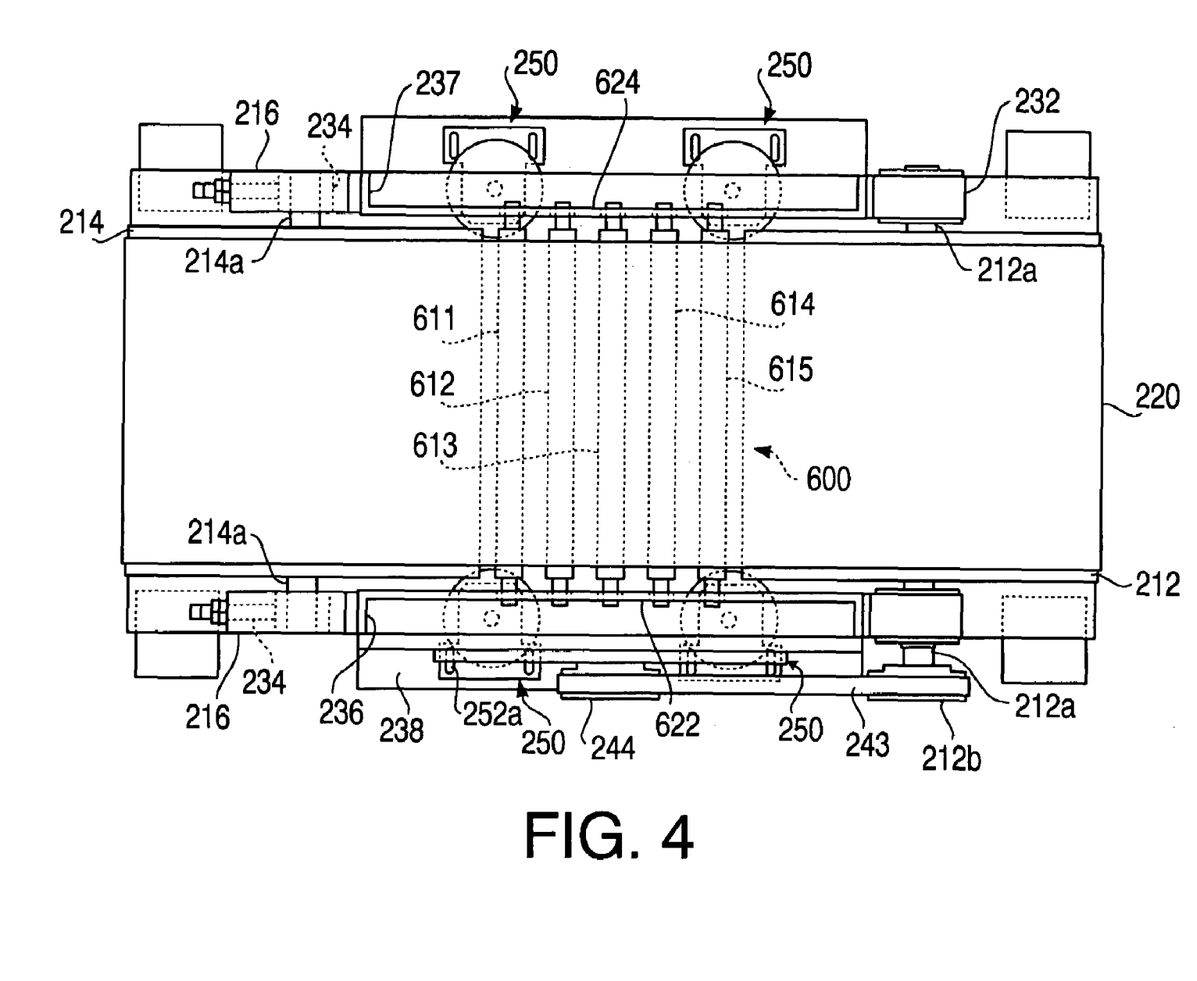
FIG. 4 is a top view of the flat-belt mechanism in the embodiment according to the present invention.

Hereinafter, explanations of the flat-belt mechanisms 200 and 300 will be given. FIG. 3 is a side view of the flat-belt mechanism 200 in the present embodiment. In addition, FIG. 4 is a top view of the flat-belt mechanism 200. It is noted that, as shown in FIG. 4, the flat-belt mechanism 300 is configured and arranged to establish bilaterally-symmetric relationship with the flat-belt mechanism 200 with a structure similar to that of the flat-belt mechanism 200. Therefore, explanation of the flat-belt mechanism 300 will be omitted.

As shown in FIG. 3, the flat-belt mechanism 200 includes a roller pair 210 of a driving roller 212 and a driven roller 214 that respectively extend in the width direction of the car C and an endless belt 220 hung around the roller pair 210. The driving roller 212 and driven roller 214 are aligned along the front-to-rear direction, and the endless belt 220 revolves around the roller pair 210 along with the rotation of the driving roller 212, while the driven roller 214 is rotated along with the movement of the endless belt 220. It is noted that diameters of the driving roller 212 and driven roller 214 are approximately 560 [mm].

The endless belt 220 is a steel plate with a thickness of approximately 0.5 [mm], and a slip-resistant rubber material 222 such as Safetywalk (trademark registered) is attached onto an outer circumferential surface of the endless belt 220. A frictional coefficient of the slip-resistant material 222 is higher than that of the steel endless belt 220, and the attachment of the slip-resistant material 222 makes the frictional coefficient between the traveling test apparatus and the tire close to that on the actual road. Thereby, conditions close to those on the actual asphalt road surface are reproduced.

Rotation shafts 212a and 214a of the driving roller 212 and driven roller 214 are rotatably supported by bearings 232 and 234, respectively. The bearings 232 and 234 are, respectively, provided with one bearing at each of both ends of the rotation shaft 212a of the driving roller 212 and one bearing at each of both ends of the rotation shaft 214a of the driven roller 214.

The bearing 234 that supports the rotation shaft 214a of the driven roller 214 includes a driven roller adjusting mechanisms 216 for moving the bearing 234 in the front-to-rear direction with a feed screw mechanism. By operating the driven roller adjusting mechanisms 216, it is possible to move the driven roller 214 and adjust a distance between the driven roller 214 and the driving roller 212. As shown in FIG. 4, the driven roller adjusting mechanisms 216 are provided at both ends of the driven rollers 214.

Thereby, a tension of the endless belt 220 is adjusted to have an appropriate value. In addition, the driven roller adjusting mechanisms 216 are used for exchanging the endless belt 220. Namely, when the endless belt 220 is attached around or removed from the roller pair 210, the endless belt 220 comes into a state where it can easily be attached or removed by moving the driven roller 214 in such a direction that a distance between the driven roller 214 and the driving roller 212 is reduced so as to loosen the endless belt 220.

The bearings 232 and driven roller adjusting mechanisms 216, provided at the driving roller 212, are fixed to roller supporting guides 236 and 237. Each pair of the bearings 232 and 234 is provided at both ends of each roller of the roller pair 210 in the width direction, and the roller supporting guides 236 and 237 are provided at the both ends of the roller pair 210 in the width direction, respectively (see FIG. 4). The roller supporting guide 236 at a near side in FIG. 3 includes a plate portion 236a extending on a surface substantially perpendicular to the rotation shaft 212a of the driving roller 212 and the rotation shaft 214a of the driven roller 214, and a front wall portion 236b and a rear wall portion 236c that are formed to respectively extend outward along the width direction from both ends of the plate portion 236a in the front-to-rear direction. The bearing 232 is fixed to the rear wall portion 236c. In addition, the driven roller adjusting mechanism 216 is fixed to the front wall portion 236b. Further, in order to improve a stiffness of the roller supporting guide 236, lower ends of the front wall portion 236b and rear wall portion 236c are mutually linked via a lower wall portion 236d extending in the front-to-rear direction. Furthermore, the roller supporting guide 237 is configured in the same manner.

Additionally, the roller supporting guides 236 and 237 are fixed onto a main supporting plate 238. Namely, the bearings 232 and 234 are fixed to the single main supporting plate 238 via the roller supporting guides 236 and 237. Accordingly, a load and vibration that are applied from the front tire Wf of the car C to the endless belt 200 are transmitted to the main supporting plate 238.

As shown in FIG. 3, the main supporting plate 238 is fixed onto a base plate 700 with bolts 710. In addition, there are provided between the main supporting plate 238 and the base plate 700 crystal piezoelectric three-component force sensors 721 to 724 (only sensors 721 and 722 are shown in FIG. 3). The load sensors 721 to 724 are located on four corners of the main supporting plate 238, respectively. Each of the load sensors 721 to 724 is formed in a disk shape with a hole being opened therein, and a predetermined preload is applied to each of the load sensors 721 to 724 by letting a bolt 710 into the hole and fastening the bolt 710 to press each of the load sensors 721 to 724 between the main supporting plate 238 and base plate 700.

In addition, a driving motor 242 for applying a load to the endless belt 220 is provided between the driving roller 212 and driven roller 214. The driving motor 242 has both ends thereof in the width direction fixed by the roller supporting guides 236 and 237. Consequently, the driving motor 242 is located within a space surrounded by the driving roller 212, driven roller 214, and endless belt 220 so as not to interfere with those members. The rotation shaft 242a of the driving motor 242 passes through a opening 236e formed in a center of the plate portion 236a of the roller supporting guide 236, and projects outward from the roller supporting guide 236. A pulley 244 is fixed at a distal end of the projecting rotation shaft 242a. The pulley 244 and a pulley 212b fixed at a distal end of the rotation shaft 212a of the driving roller 212 are linked via an endless belt 243. Therefore, a driving power of the rotation shaft 242a of the driving motor 242 is transmitted to the endless belt 220 via the pulley 244, endless belt 243, pulley 212b, and driving roller 212. In other words, a load can be applied to the endless belt 220 by the driving motor 242.

So as to support the rotation shaft 242a in a position closer to the distal end of the rotation shaft 242a of the driving motor 242, that is, in a position close to the pulley 244, a bearing 245 for the driving motor is fixed onto a bearing fixing plate 239 straddling both outer end surface, in the width direction, of the front wall portion 236b and rear wall portion 236c of the roller supporting guide 236. It is noted that an opening 239a for letting the rotation shaft 242a of the driving motor 242 pass therethrough is formed in a center of the bearing fixing plate 239.

As described above, in the chassis dynamometer 1 of the present embodiment, the driving motor 242 for the drive absorption and various members (the pulley 244, etc.) associated with the driving motor 242 are all supported by the main supporting plate 238 via the roller supporting guides 236 and 237. For this reason, a mechanical loss transmitted from the rotation shaft 242a of the driving motor 242 and a reactive force of a mechanical loss transmitted to the driving motor 242 are concurrently applied to the load sensors. Consequently, a load transmitted from the front tire Wf to the endless belt 220 is only detected by the load sensors 721 to 724 in a substantially accurate manner. In other words, in the chassis dynamometer 1 of the present embodiment, it is possible to accurately detect a load variation and vibration transmitted from the front tire Wf.

A below-mentioned rotary encoder (not shown in FIG. 3) is provided at the rotation shaft 214a of the driven roller 214, a revolution number of the driving roller 212 is measured by the rotary encoder 217, and a speed of the endless belt 220, that is, a circumferential velocity of the front tire Wf contacting the endless belt 220 is determined from the measurement results. Additionally, another rotary encoder (not shown in FIG. 3) is provided at the rotation shaft 212a of the driving roller 212 as well. When there is a difference between the revolution number detected by the encoder at the driving roller 212 side and the revolution number detected by the rotary encoder 217 at the driven roller 214 side, it means that there is generated slip between the driving roller 212 and the endless belt 220. The control unit 800 judges whether there is generated the slip between the driving roller 212 and the endless belt 220 from the revolution numbers detected by both the rotary encoder 217 and the rotary encoder at the driving roller 214 side. When it is judged that the slip is generated, the control unit 800 informs of the defect of the apparatus.

Hereinafter, a supporting roller mechanism 600 for supporting an upper portion of the endless belt 220 will be described. The supporting roller mechanism 600 is, as shown in FIG. 3, provided with five rollers 611 to 615 aligned along the front-to-rear direction and having their respective rotation shafts extending along the width direction. Each of the rollers 611 to 615 has both ends thereof rotatably supported by bearings 622 and 624 respectively provided at the roller supporting guide 236 and 237. Arrangements of the rollers 611 to 615 are adjusted such that upper ends thereof are as high as or higher than upper ends of the driving roller 212 and driven roller 214. Therefore, the upper ends of the rollers 611 to 615 always establish close contact with an inner circumference of the endless belt 220. Accordingly, in a state where the front tire Wf is placed on the flat-belt mechanisms 200, the front tire Wf is supported by not only the endless belt 220 but also the rollers 611 to 615.

The chassis dynamometer 1 of the present embodiment is, as described above, configured such that the drive wheel of the car C is placed on the flat-belt mechanism and then the endless belt of the flat-belt mechanism is revolved in the front-to-rear direction along with the drive wheel being driven. Here, when a rotation shaft of the drive wheel is tilted with respect to the rotation shafts of the rollers of the flat-belt mechanism, that is, when a traveling direction of the car is different from the traveling direction of the flat-belt mechanism, a lateral force is applied to the endless belt. In the present embodiment, a guide roller mechanism for preventing a shift of the endless belt in the width direction that may be caused by the lateral force is provided.

Hereinafter, the guide roller mechanism 250 provided to the flat-belt mechanism 200 will be explained. It is noted that a similar guide roller mechanism is provided to the flat-belt mechanism 300. The guide roller mechanism 250 includes disc-shaped guide rollers 251 that contact both ends of a lower portion of the endless belt 220 in the width direction and bearing plates 252 that rotatably support the guide rollers. In the present embodiment, there are provided two guide roller mechanisms 250 at one end of the endless belt 220 in the width direction and two guide roller mechanisms 250 at the other end, which are configured to support the endless belt 220 from both ends of the endless belt 220. In the present embodiment, the guide roller mechanisms 250 are configured to support both the ends of a lower portion of the endless belt 220 in the width direction. However, the guide roller mechanisms 250 may be configured to support both ends of an upper portion of the endless belt 220 in the width direction, or to support both ends of each of the upper and lower portions of the endless belt 220 in the width direction.

The bearing plates 252 of the guide roller mechanisms 250 are fixed onto the main supporting plate 238. As shown in FIG. 4, elongate holes 252a extending along the width direction are formed at both ends of each of the bearing plates 252 in the front-to-end direction. The bearing plate 252 is fixed onto the main supporting plate 238 with bolts (not shown) being fastened via the elongate holes. In the present embodiment, since the bearing plate 252 is fixed with the bolts being fastened via a pair of elongate holes, a location of the bearing plate 252 with respect to the main supporting plate 238 is adjustable in the width direction. In addition, as shown in FIG. 4, major part of the guide roller mechanism 250 is located outside the plate portion 236a of the roller supporting guide 236 in the width direction. A notch 236f (FIG. 3) is provided at a lower portion of the plate portion 236a such that the guide roller 251 penetrates the plate portion 236a to contact the endless belt 220 in this state.

Figure 5:
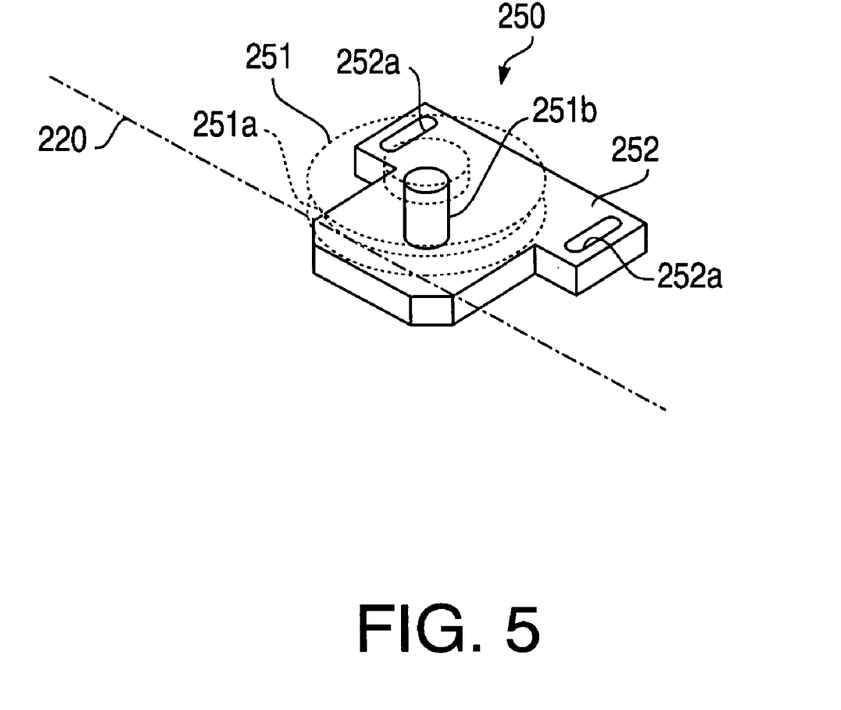
FIG. 5 is an enlarged view of the flat-belt mechanism in the embodiment according to the present invention.

An enlarged view of the guide roller mechanism 250 is shown in FIG. 5. As shown in FIG. 5, a groove 251a that circumferentially extends is formed on a cylinder surface of the guide roller 251. A width of the groove 251a is slightly larger than a thickness of the endless belt 220. In a state where the guide roller mechanism 250 is attached to the flat-belt mechanism 200, an end portion of the endless belt 220 in the width direction enters in the groove 251a.

Further, a bearing portion (not shown in FIG. 5) for supporting a rotation shaft 251b of the guide roller 251 is fitted into the bearing plate 252. The bearing portion is biased toward the endless belt 220 by a spring (not shown in FIG. 5) installed into the bearing plate 252. Consequently, the groove 251a of the guide roller 251 contacts the endless belt 220. Furthermore, since the groove 251a always establishes contact with the endless belt 220, the endless belt 220 is guided by the groove 251a so as not to be shifted in a vertical direction.

In addition, the guide roller 251 of each of the four guide roller mechanisms 250 is biased toward the endless belt 220, and contacts the endless belt 220 under substantially the same load. Consequently, a slip between the endless belt 220 and guide roller 251 is hard to be caused. When the slip is caused between the endless belt 220 and guide roller 251, the guide roller 251 is worn more quickly. Hence, the guide roller 251 is made more durable by the configuration in the present embodiment.

Further, so as to further prevent the wear of the guide roller 251, the guide roller 251 is formed from a material with a high hardness such as a quenched steel. Furthermore, both end surfaces of the endless belt 220 in the width direction and a cylindrical surface of the guide roller 251 are covered with coating material such as hard chrome plating. Therefore, the both end surfaces of the endless belt 220 in the width direction and the cylindrical surface of the guide roller 251 are formed to be smooth, and thereby a frictional coefficient therebetween is reduced.

Figure 6:
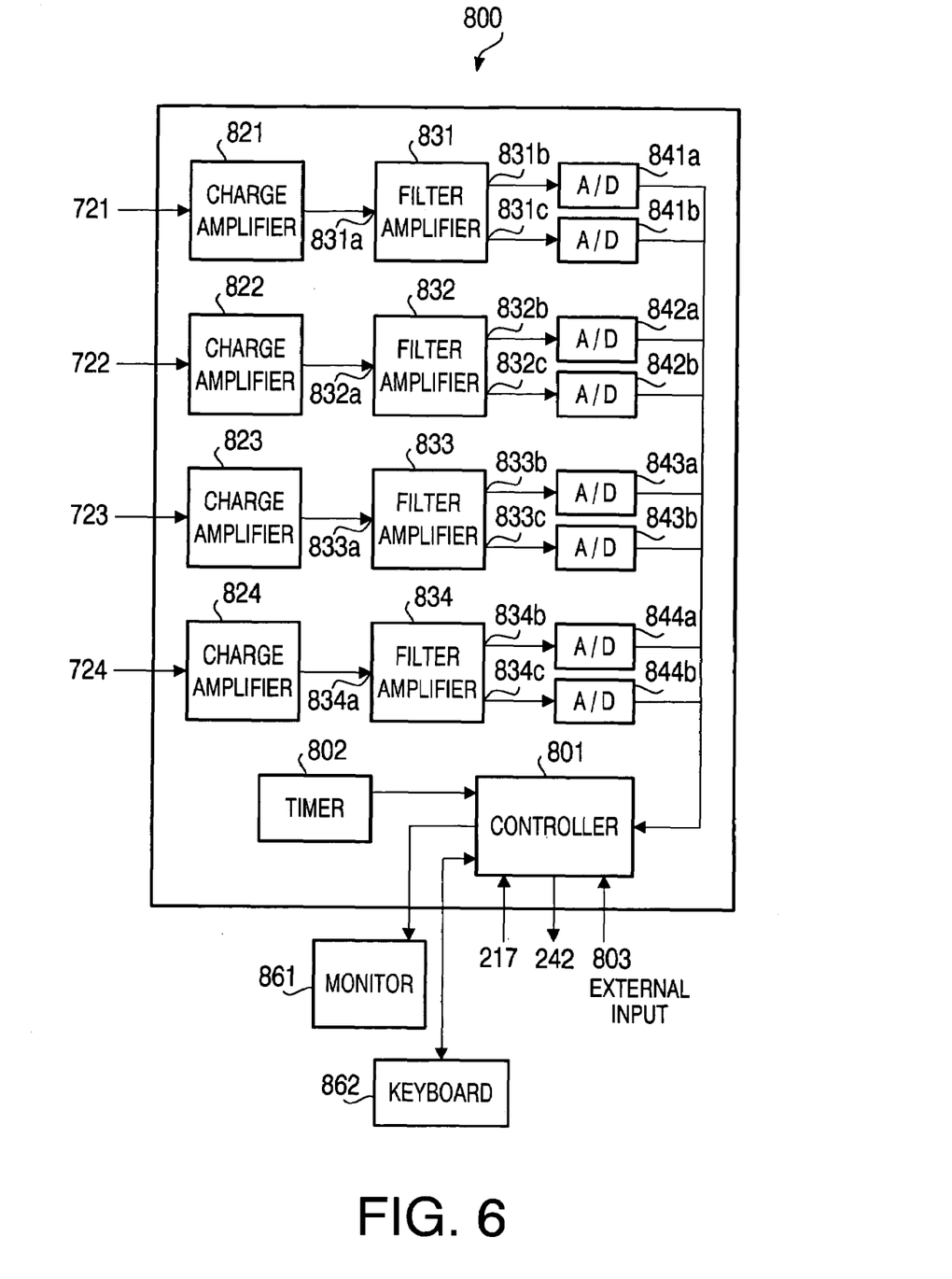
FIG. 6 is a block diagram of a guide roller mechanism in the embodiment according to the present invention.

The control unit 800 performs processing of outputs from the load sensors 721 to 724 and the rotary encoder 217 and control of the driving motor 242 (and processing of outputs from corresponding load sensors and control of a corresponding driving motor at the flat-belt mechanism 300 side). FIG. 6 is a block diagram of the control unit 800.

The load sensors 721 to 724 are connected with charge amplifiers 821 to 824, respectively. Thereby, the outputs of the load sensors 721 to 724 are amplified. Outputs of the charge amplifiers 821 to 824 are inputted into signal input terminals 831a to 834a of filter amplifiers 831 to 834, respectively.

The filter amplifiers 831 to 834 remove noises from signals inputted thereinto and concurrently amplify the signals with a predetermined gain. In addition, the filter amplifiers 831 to 834 have control signal output terminals 831b to 834b and 831c to 834c, respectively, which are connected with the controller 801. The filter amplifiers 831 to 834 amplify the inputted signals with one of two kinds of gains A1 and A2. Signals amplified with the gain A1 are digitized by A/D converters 841a to 844a via the signal output terminals 831b to 834b of the amplifiers 831 to 834. In addition, signals amplified with the gain A2 are digitized by A/D converters 841b to 844b via the signal output terminals 831c to 834c. It is noted that the gain A2 is higher than the gain Al.

The digitized signals are inputted into the controller 801 and processed there. In the present embodiment, for the sake of simplicity, there is represented such a configuration that each of the outputs of the load sensors 721 to 724 is processed by a single signal processing system. However, each of the load sensors 721 to 724 is a three-component force sensor and has three output terminals. Accordingly, each signal processing system has three-channel signal processing systems. The controller 801 calculates orthogonal three-axis components of a force transmitted from the front tire Wf of the car C to the endless belt 220 by summing the outputs of the load sensors 721 to 724 for each of the three axes. Further, by computing the outputs of the load sensors 721 to 724 with an already-known predetermined method, the controller 801 calculates moments with respect to the three orthogonal axes that are transmitted from the front tire Wf of the car C to the endless belt 220.

In addition, an output pulse of the rotary encoder is inputted into the controller 801 as it is. The controller 801 is connected with a timer 802 measuring time, and measures a revolution number of the rotary encoder 217 (that is, a revolution number of the driven roller 214) by measuring a pulse interval of the pulses outputted by the rotary encoder 217 with reference to the timer.

Additionally, the control unit 800 has an external input terminal 803, which is connectable with various sensors (such as a sensor for detecting concentrations of gas emission of the car C and a flow sensor) provided outside the apparatus. A sensor output is inputted into the controller 801 through the external input terminal 803.

Furthermore, the controller 801 is connected with the driving motor 242 and controls operation of the driving motor 242.

The controller 801 is connected with a monitor 861 for displaying thereon indicators obtained by processing the outputs of the various sensors and a keyboard 862 for inputting therethrough various data into the control unit 800. An operator of the traveling test apparatus 1 can perform various controls for the traveling test apparatus 1, such as adjustment of a torque of the driving motor 242 and record of measurement results, by inputting various data through the keyboard 862.

The above explanation of the control unit 800 is about relevance of the control unit 800 with the sensors and motor at the flat-belt mechanism 200 side. In the same manner, the control unit 800 is connected with sensors and a motor at the flat-belt mechanism 300 side, and can process signals from the sensors and/or control the motor.

As described above, the chassis dynamometer is a belt-type chassis dynamometer using the flat-belt mechanism provided with the roller pair and endless belt. However, such a configuration that a motor for the drive absorption is fixed to a supporting member that supports a drum in a drum-type chassis dynamometer using the drum instead of the flat-belt mechanism is also within a technical scope of the present invention. In addition, the main body of the flat-belt mechanism and a vehicle traveling test apparatus, other than a chassis dynamometer, provided with the flat-belt mechanism (for example, an apparatus for performing braking force measurement, force variation measurement, and/or speedometer test) is also within the technical scope of the present invention.

According to the aforementioned embodiment, a chassis dynamometer that can measure a load transmitted from a drive wheel of a vehicle more accurately is actualized. Further, according to the configuration of the present embodiment, the declination of the endless belt can be prevented by the supporting members. As the supporting members, for example, there are cited a plurality of guide rollers rotated along with the revolution of the endless belt. When supporting the belt that is traveling at a high circumferential velocity of 100 to 200 [km/h], it is possible to prevent the supporting members from being worn and to make the lives of the supporting members longer by using the supporting members, such as the guide rollers, rotated by the traveling of the belt.

According to an aspect of the present invention, there is provided the chassis dynamometer, wherein the rotation member includes a pair of rollers, and wherein the chassis dynamometer further includes an endless belt hung around the pair of rollers, the endless belt being configured to establish contact with at least one drive wheel provided to the vehicle and to be revolved around the pair of rollers by rotation of the at least one drive wheel.

According to the above configuration using the flat-belt mechanism, it is possible to perform the traveling test in a state where the drive wheel contacts a plane, which is close to an actual traveling state.

Further, according to another aspect of the present invention, there is provided the chassis dynamometer, which further includes a first pulley provided at a rotation shaft of the motor, a second pulley provided at a rotation shaft of a roller of the pair of rollers, and a roller driving endless belt hung around the first and second pulleys.

With the above configuration, the motor for the drive absorption can be located in a relatively free manner.

In an aspect of the embodiment according to the present invention, the motor is arranged between the rollers of the pair.

With the above configuration, a compact apparatus is actualized.

In an aspect of the embodiment according to the present invention, the endless belt is made of metal.

Optionally, the endless belt may be made of steel.

With the above configuration, a flat-belt mechanism with a high stiffness and a high durability is actualized.

Optionally, a slip-resistant material may be provided on an outer circumferential surface of the endless belt.

With the above configuration, conditions close to the actual road surface can be actualized.

In an aspect of the embodiment according to the present invention, the chassis dynamometer further includes a plurality of supporting rollers, the plurality of supporting rollers contact the endless belt, and the endless belt is sandwiched between at least one of the plurality of supporting rollers and the at least one drive wheel.

With the above configuration, since the drive wheel contacts a more plane and higher-stiffness surface, conditions closer to the actual road surface can be actualized.

Optionally, the chassis dynamometer may further include a tension adjusting element configured to adjust a tension of the endless belt.

In an aspect of the embodiment according to the present invention, the tension adjusting element may adjust the tension of the endless belt by moving at least one of the rollers of the pair.

With the above configuration, an operation for exchanging the endless belt can easily be carried out.

Optionally, the chassis dynamometer may further include a rotary encoder provided at a rotation shaft of the rotating member.

With the above configuration, it is possible to apply an inertia force to the car body by applying to the wheel a force depending on the change (acceleration or deceleration) of the rotational speed of the wheel.

Optionally, the load sensor may include a six-component force sensor.

Optionally, the six-component force sensor includes a plurality of three-component force sensors and a computing unit configured to compute moments with respect to three axes from detection results of the plurality of three-component force sensors.

With the above configuration, it is possible to acquire forces along the orthogonal three axes and moments with respect to the three axes at the same time.

In an aspect of the embodiment according to the present invention, the supporting member includes a plurality of guide rollers configured to be rotated by the revolution of the endless belt.

With the above configuration, it is possible to prevent the endless belt from shifting in the width direction without disturbing the revolution of the endless belt.

In an aspect of the embodiment according to the present invention, each of the plurality of guide rollers includes a circumferentially extending groove formed on a cylindrical surface thereof, and an end of the endless belt in the width direction enters in the groove.

With the above configuration, it is possible to prevent the endless belt from shifting in the vertical direction. Therefore, it is hard for the endless belt to drop off.

In an aspect of the embodiment according to the present invention, rotation shafts of the plurality of guide rollers are attached to a plurality of spring elements that respectively bias the plurality of guide rollers toward the endless belt.

With the above configuration, the guide rollers do not get away from the endless belt, and each of the guide rollers receives an even force from the endless belt. Thereby, it is possible to prevent rapid progress of the wear of a specified guide roller that might be caused by a stress concentrated on the specified guide roller. Consequently, the lives of the guide rollers can further be made longer. Additionally, the endless belt is guided by the groove, and the shifts thereof in the vertical direction and width direction are further restricted. Thus, it is hard for the endless belt to drop off.

In an aspect of the embodiment according to the present invention, the circumferential surfaces of the guide rollers and both ends of the endless belt in the width direction are coated.

In the above configuration, the coating reduces surface roughness of each of the circumferential surfaces of the guide rollers and both ends of the endless belt in the width direction. Thereby, the frictional force applied to the guide rollers is reduces. Accordingly, the wear between the guide rollers and the endless belt is restrained, and the lives of the guide rollers are made longer.

Optionally, the coating may include hard chrome plating.

Optionally, the guide rollers may be formed from quenched iron.

With the above configuration, the guide rollers of high durability can be obtained with a relatively low cost.

In an aspect of the embodiment according to the present invention, the ends of the endless belt in the width direction may be formed in a rounded shape, for example, with a semicircular cross section along a plane perpendicular to an extending direction of the endless belt.

With the above configuration, stress concentration in a position where each guide roller contacts the endless belt is reduced, and the wear and plastic deformation of the guide roller that may be caused by the contact between the guide roller and the endless belt are restrained, so that the life of the guide roller can further be made longer.

In an aspect of the embodiment according to the present invention, the traveling test apparatus further includes a bearing supporting member to which a housing of the pair of bearings of the bearing portion is fixed, a base configured to support the bearing supporting member from beneath the bearing supporting member, and a load sensor arranged between the bearing supporting member and the base, the load sensor being configured to measure a force transmitted from the drive wheel of the vehicle to the flat-belt mechanism.

With the above configuration, it is possible to accurately measure a force transmitted from the vehicle to the traveling test apparatus without being affected by the mechanical loss of the traveling test apparatus.

In an aspect of the embodiment according to the present invention, the traveling test apparatus further includes a plurality of supporting rollers, wherein the supporting roller contacts the endless belt, and wherein the endless belt is sandwiched between at least one of the plurality of supporting rollers and the at least one drive wheel. It is noted that the aforementioned embodiment is illustrative and not provided to limit a technical scope of the present invention. The aforementioned embodiment includes various features, yet the features may not necessarily be required for all embodiments according to the present invention. Some embodiments according to the present invention may include only some of the aforementioned features. In addition, an embodiment according to the present invention that includes a different combination of the aforementioned features can easily be figured out by one of ordinary knowledge in the art to which the invention pertains. Furthermore, the aforementioned numerical values and materials are illustrative ones provided for the sake of easy understanding of the present invention, and not given to limit the scope of the present invention. The technical scope of the present invention should be limited only by the description in "WHAT IS CLAIMED IS."

What is claimed is:

1. A chassis dynamometer, comprising:
   a flat-belt mechanism configured such that a drive wheel of a vehicle is placed thereon, which includes:
      a rotating member configured to be rotated by rotation of the drive wheel;
      a bearing portion configured to rotatably support the rotating member;
      a motor configured to apply a resistance to the rotation of the rotating member; and
      a bearing supporting member to which a housing of the bearing portion and the motor are fixed;
   a base configured to support the bearing supporting member from beneath the bearing supporting member;
   a plurality of three-component force sensors arranged between the bearing supporting member and the base to measure a force transmitted from the drive wheel to the flat-belt mechanism; and
   a computing unit configured to compute moments with respect to three axes based on measurement results of the plurality of three-component force sensors.

2. The chassis dynamometer according to claim 1,
   wherein the rotation member comprises a pair of rollers, and
   wherein the chassis dynamometer further comprises an endless belt hung around the pair of rollers, the endless belt being configured to establish contact with at least one drive wheel provided to the vehicle and to be revolved around the pair of rollers by rotation of the at least one drive wheel.

3. The chassis dynamometer according to claim 2, further comprising:
   a first pulley provided at a rotation shaft of the motor;
   a second pulley provided at a rotation shaft of a roller of the pair of rollers; and
   a roller driving endless belt hung around the first and second pulleys.

4. The chassis dynamometer according to claim 2,
   wherein the motor is arranged between the rollers of the pair.

5. The chassis dynamometer according to claim 2,
   wherein a slip-resistant material is provided on an outer circumferential surface of the endless belt.

6. The chassis dynamometer according to claim 2, further comprising a plurality of supporting rollers,
   wherein the plurality of supporting rollers contact the endless belt, and
   wherein the endless belt is sandwiched between at least one of the plurality of supporting rollers and the at least one drive wheel.

7. The chassis dynamometer according to claim 2, further comprising a tension adjusting element configured to adjust a tension of the endless belt.

8. The chassis dynamometer according to claim 7,
wherein the tension adjusting element adjusts the tension of the endless belt by moving at least one of the rollers of the pair.

9. The chassis dynamometer according to claim 1, further comprising a rotary encoder provided at a rotation shaft of the rotating member.

10. The chassis dynamometer according to claim 1,
wherein the plurality of three-component force sensors and the computing unit are included in a six-component force sensor configured to output three independent components along three orthogonal axes and three independent moments with respect to the three orthogonal axes of the force transmitted from the drive wheel to the flat-belt mechanism.

11. The chassis dynamometer according to claim 1,
wherein each of the plurality of three-component force sensors comprises a piezoelectric three-component force sensor.

12. The chassis dynamometer according to claim 2, further comprises a supporting member configured to contact both ends of the endless belt in a width direction of the endless belt and support the endless belt.

13. The chassis dynamometer according to claim 12,
wherein the supporting member comprises a plurality of guide rollers configured to be rotated by the revolution of the endless belt.

14. The chassis dynamometer according to claim 13,
wherein rotation shafts of the plurality of guide rollers are attached to a plurality of spring elements that respectively bias the plurality of guide rollers toward the endless belt.

15. The chassis dynamometer according to claim 13,
wherein each of the plurality of guide rollers includes a circumferentially extending groove formed on a cylindrical surface thereof, and
wherein an end of the endless belt in the width direction enters in the groove.

16. The chassis dynamometer according to claim 13,
wherein the ends of the endless belt in the width direction are formed in a rounded shape.

17. The chassis dynamometer according to claim 1,
wherein each of the plurality of three-component force sensors is placed with a preload being applied thereto.

18. The chassis dynamometer according to claim 11,
wherein the piezoelectric three-component force sensor comprises a crystal piezoelectric element.

\* \* \* \* \*